United States Patent
Cho

(10) Patent No.: US 7,209,737 B2
(45) Date of Patent: Apr. 24, 2007

(54) METHOD FOR AFTER SERVICE OF MOBILE TELEPHONE

(75) Inventor: Byoung Kuan Cho, Seoul (KR)

(73) Assignee: LG Electronics, Inc., Seoul (KR)

( * ) Notice: Subject to any disclaimer, the term of this patent is extended or adjusted under 35 U.S.C. 154(b) by 827 days.

(21) Appl. No.: 09/741,424

(22) Filed: Dec. 21, 2000

(65) Prior Publication Data

US 2001/0006891 A1    Jul. 5, 2001

(30) Foreign Application Priority Data

Dec. 28, 1999    (KR) .............................. 1999-63817

(51) Int. Cl.
*H04Q 7/20*    (2006.01)
(52) U.S. Cl. ..................... 455/425; 455/423; 455/566
(58) Field of Classification Search ............... 455/423, 455/425, 67.13, 115.1, 115.2, 115.3, 115.4, 455/226.1, 226.2, 226.3, 226.4, 418, 419, 455/420
See application file for complete search history.

(56) References Cited

U.S. PATENT DOCUMENTS

| 5,706,333 | A | * | 1/1998 | Grenning et al. ........... 455/423 |
| 5,805,666 | A | * | 9/1998 | Ishizuka et al. ........... 379/1.01 |
| 5,819,177 | A | * | 10/1998 | Vucetic et al. ............... 455/425 |
| 6,088,588 | A | * | 7/2000 | Osborne ..................... 455/425 |
| 6,125,274 | A | * | 9/2000 | Komives et al. ............ 455/423 |
| 6,144,849 | A | * | 11/2000 | Nodoushani et al. ....... 455/419 |
| 6,169,883 | B1 | * | 1/2001 | Vimpari et al. .......... 455/67.11 |
| 6,408,175 | B1 | * | 6/2002 | Park .......................... 455/411 |

FOREIGN PATENT DOCUMENTS

| JP | 6-294443 | 4/1987 |
| WO | WO 99/57823 | 11/1999 |

OTHER PUBLICATIONS

JP office action dated Dec. 13, 2004.

* cited by examiner

*Primary Examiner*—Temica Beamer
(74) *Attorney, Agent, or Firm*—Ked & Associates, LLP

(57) ABSTRACT

The invention relates to a mobile terminal, and in particular to a method for after service of a mobile terminal which is adapted to optimize the performance of the mobile terminal. The method comprises the steps of: self-diagnosing, judging if the terminal malfunctions and connecting with the A/S center in the mobile terminal; requesting from the A/S center state information for indicating the operated condition to the mobile terminal; transmitting from the mobile terminal the stated information thereof according to the request; analyzing the transmitted state information and transmitting control information; and correcting the operated condition of the mobile terminal according to the transmitted control information. According to the method for after service of the mobile terminal, the inconvenience of the user to visit the A/S center can be reduced.

28 Claims, 5 Drawing Sheets

METHOD FOR AFTER SERVICE OF MOBILE TELEPHONE

BACKGROUND OF THE INVENTION

1. Field of the Invention

The invention relates to a mobile terminal, and in particular to a method for after service of a mobile terminal which is adapted to optimize the performance of the mobile terminal.

2. Description of the Related Art

Generally, in the personal communication service(PCS), a user can communicate with any one at any time and place by using a mobile terminal. Such mobile terminals for the personal communication service are rapidly spreading since they can provide high quality conversation service, hand off, various additional services, multimedia service, etc.

In proportion to the spreading of the mobile terminals like this, the importance of after service for providing high quality communication service to the users is also increasing.

FIG. 1 is a flow chart for showing an after service procedure of a mobile terminal in the related art;

Referring to FIG. 1, when the mobile terminal malfunctions in S100, the user inquires a customer consultant center of the pertinent service provider about the conversation or an after service center (hereinafter referred to as A/S center) about the possibility of failure of the mobile terminal in S101.

When the user inquired the customer consultant center about the conversation in S102, if the customer consultant center fails to provide a relevant explanation in S103, the user contacts the A/S center to solve this problem in S105.

Here, the A/S center judges if the terminal is broken or not in S106, and provides a software update of the terminal, calibration adjustment or explanation to the user as an after service in S107 if the terminal is not broken as a result of the judgment. However, if the mobile terminal is proved broken as a result of the judgment, the A/S center repairs the mobile terminal in S108.

Considering the after service to the mobile terminal in the related art, there is a problem that the user should visit the A/S center whenever the terminal malfunctions since the user him/herself cannot judge if the terminal is broken or not.

In other words, the user should visit the A/S center even if the terminal is not broken in hardware but only has some problems in the performance thereof, and thus time and cost may be wasted.

SUMMARY OF THE INVENTION

It is therefore an object of the invention to provide a method for after service of a mobile terminal which is adapted to optimize the performance of the mobile terminal by connecting the mobile terminal and an A/S center via a radio network.

To obtain the foregoing object of the invention, it is provided according to an embodiment of the invention a method for after service of a mobile terminal in a system having the mobile terminal and an A/S center, the method comprising the steps of: self-diagnosing, judging if the terminal malfunctions and connecting with the A/S center in the mobile terminal; requesting from the A/S center state information for indicating the operated condition to the mobile terminal; transmitting from the mobile terminal the stated information thereof according to the request; analyzing the transmitted state information and transmitting control information; and correcting the operated condition of the mobile terminal according to the transmitted control information.

According to the method for after service of the mobile terminal of the invention, the mobile terminal and A/S center are connected via the radio network and the operating state of the terminal is remote controlled for optimization thereof so that the inconvenience of visiting the A/S center can be reduced.

DETAILED DESCRIPTION OF THE INVENTION

Hereinafter the structure and operation according to preferred embodiments of the invention will be described in reference to the appended drawings.

The invention proposes a method for after service of a mobile terminal by which a user contacts an A/S center via a radio communication network to optimize the operation of the mobile terminal without visiting the A/S center.

To achieve the object, the mobile terminal of the invention is radio connected with the A/S center to transmit state information thereof to the A/S center, and the A/S center transmits control information for optimizing the operated condition of the mobile terminal according to the state information transmitted from the mobile terminal.

Here, the state and control information is sent and received between the mobile terminal and the A/S center by using an SMS (Short Message Service).

The foregoing SMS is a kind of a radio data service for transmitting a message on a data burst message by setting service option on the IS-95A as 6 or 14, in which the TIA/EIA IS-637 defines the function of a higher layer based upon it.

For the SMS, the terminal should be additionally installed with a pertinent software to transmit and receive a simple or short message, and also the system is required to further comprise an MC (Message Center) as a network element capable of processing the SMS and supplementarily the related network protocol. The related protocol is defined in the TIA/EIA/IS-637.

Figure 1:
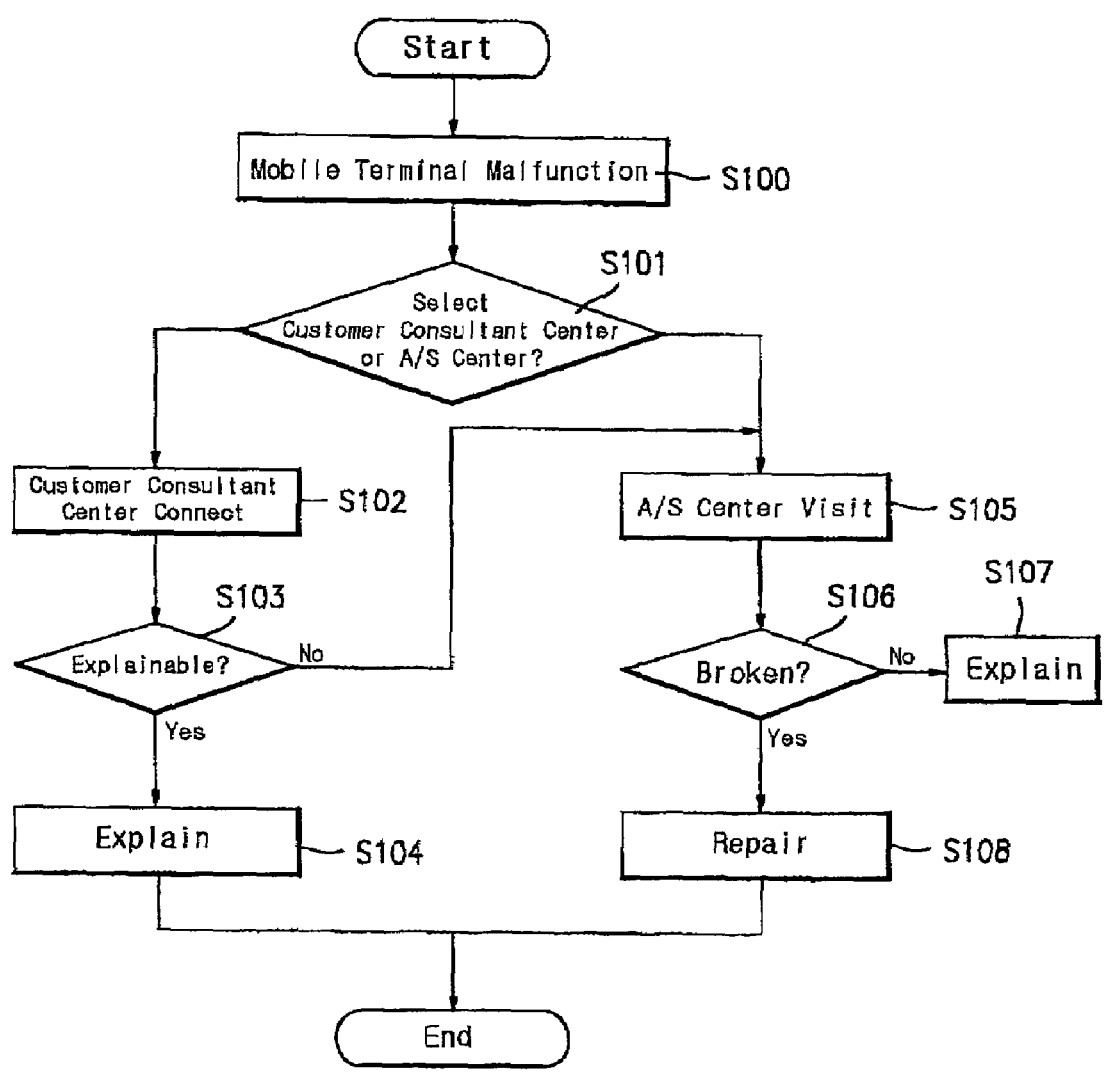
FIG. 1 is a flow chart for showing a procedure for after service of a mobile terminal in the related art.
Figure 2:
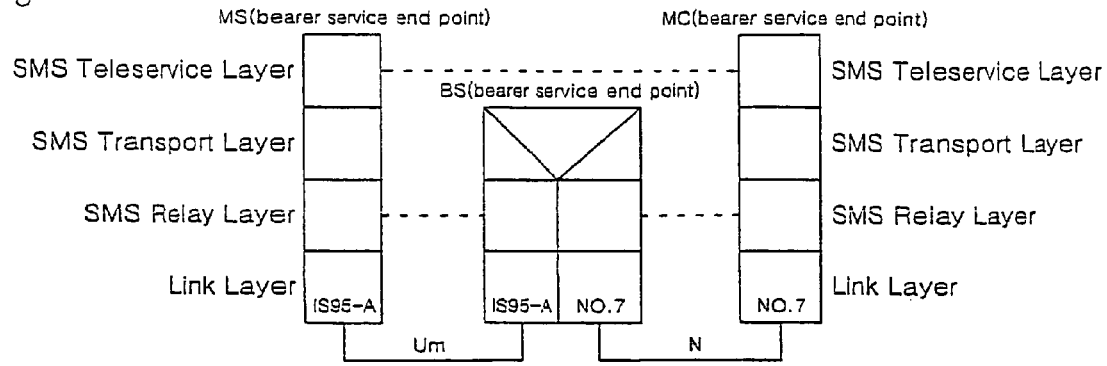
FIG. 2 is a diagram for showing an SMS protocol stack.

FIG. 2 is a diagram for showing an SMS protocol stack, in which the SMS is constructed based upon the data burst message(link layer) of the IS-95-A and the transmitted message length is generally at most 200 bytes of about 100 Korean characters.

As shown in FIG. 2, the SMS protocol stack is transmitted to a forward traffic channel or a paging channel of a forward channel, and in a reverse channel, transmitted to the data burst message of a reverse traffic channel or an access channel.

When the subscriber is on conversation, it is operated in a multiplex option which allows data transmission during voice conversation.

The SMS is set by the data burst message as the link layer, and a relay layer sets the transmission channel according to the state of the terminal (such as idle mode or traffic mode) and the message length.

The functions of the relay layer are described in detail as follows:

1. The relay layer receives a message from a transport layer and transmits the message to the indicated next relay point or end point;

2. if the message is not transmitted to the next relay point or end point, generates an error indication to the transport layer;

3. transmits the received message to the transport layer; and 4. performs a connect and control to the IS-95-A link layer for a message relay.

The transport layer basically defines the termination point of the MC of a message transceiver and the terminal, and receives a bearer data from a teleservice layer in the terminal to construct the message. The detailed functions are as follows:

1. The transport layer receives message parameters from the teleservice layer to construct a transport layer message and transmits the message to the relay layer by using a suitable relay layer service primitive;

2. informs the relay layer of a received acknowledgement about all of the transmitted messages;

3. informs the teleservice layer of a reported error about the replay layer;

4. receives the SMS message from the relay layer and transmits the same to the teleservice layer; and 5. performs a procedure for an authentication specified in the IS-637 when the authentication is enabled in the network; but 6. the SMS acknowledgement message is not supported in the network.

The teleservice layer uses a standard subsparameter of the short message data parameter of the transport layer to support basic SMS functions.

1. The teleservice layer transmits destination address to the transport layer when the terminal transmits an SMS user Ack message;

2. when the received message is an SMS deliver message and a reply option is set in terminal receiving, transmits the message to the user; and 3. suitably selects a MESSAGE_ID when sending an SMS submit message in terminal origination.

Hereinafter the parameter structure of each layer will be described.

Figure 3:
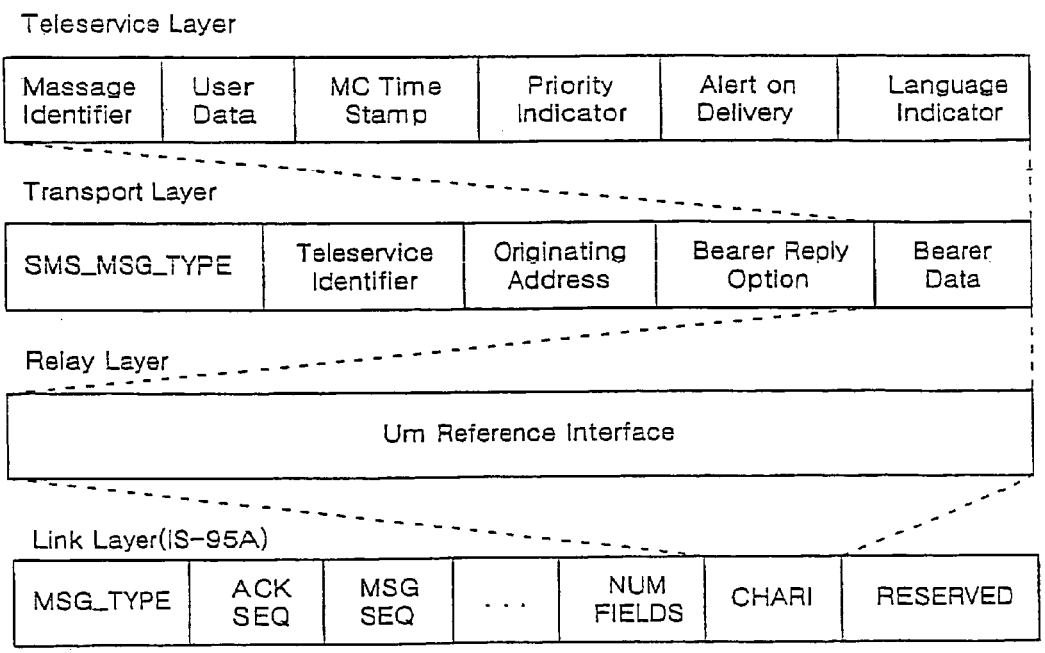
FIG. 3 shows a message structure according to the layers for performing the SMS.

FIG. 3 shows a message structures according to the layers for performing the SMS.

As can be seen in FIG. 3, in a CHARi message of the data burst message, the SMS parameter is encapsulated and transmitted to a higher level via analysis thereof.

The transport layer is constructed based upon the data burst message of the IS-95-A which performs as the link layer via a Um interface as shown in FIG. 3. The transport layer message includes a teleservice identifier that is a service identifier such as a voice mailbox or a general message, an originating address, a bearer reply option and bearer data.

The bearer data forms the teleservice layer, which provides an application service.

The teleserver layer is comprised of user data, an MC time stamp about a corresponding message, a priority indicator, a privacy indicator, an alert on delivery and a language indicator.

Also, the data service is a kind of radio data service which is a radio transmission type specified in the TIA/EIA IS-707.

Figure 4:
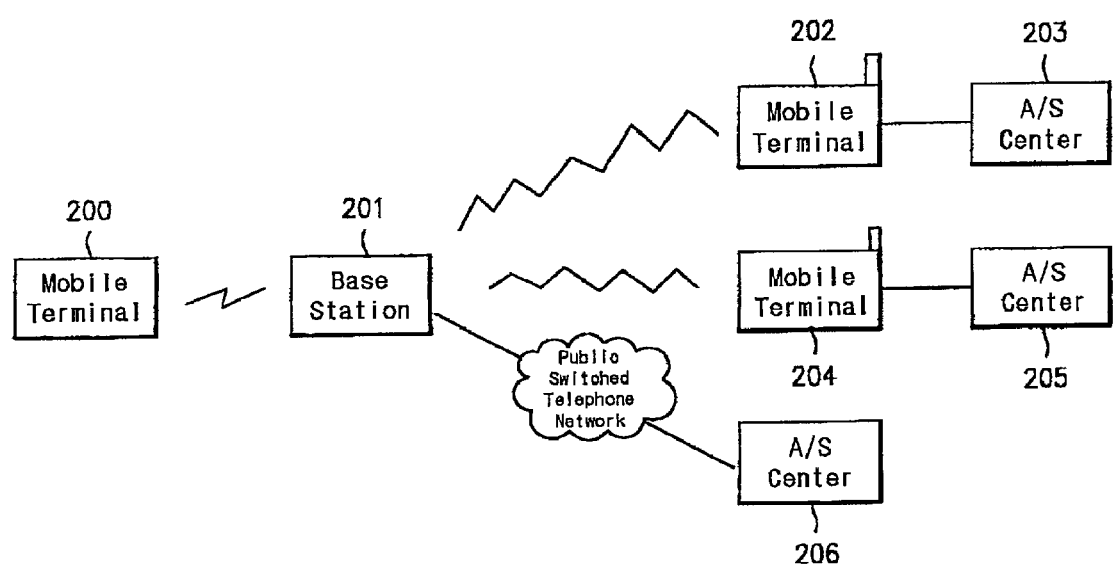
FIG. 4 is a structural view of a communication network for providing a method for after service to a mobile terminal according to the invention.

FIG. 4 is a structural view of a communication network for providing a method for after service to a mobile terminal according to the invention.

Referring to FIG. 4, the communication network of the invention has a mobile terminal 200, a base station 201 radio connected with the mobile terminal 200 and A/S centers 203, 205 and 206 connected with the base station 201.

Here, the base station 201 and the A/S center 206 are wire connected via a PSTN (Public Switched Telephone Network), the base station 201 and an A/S center 205 are radio connected via a mobile terminal 204 by using a cellular radio network, and the base station 201 and an A/S center 203 is radio connected via a data communication service. The mobile terminal 200 and the A/S centers 203, 205 and 206 are connected via the base station 201 according to these three methods.

The mobile terminal 200 transmits state information thereof to the A/S centers 203, 205 and 206, and the A/S centers 203, 205 and 206 transmits control information for optimizing the operated condition of the mobile terminal via the communication networks which are constructed like this.

Figure 5:
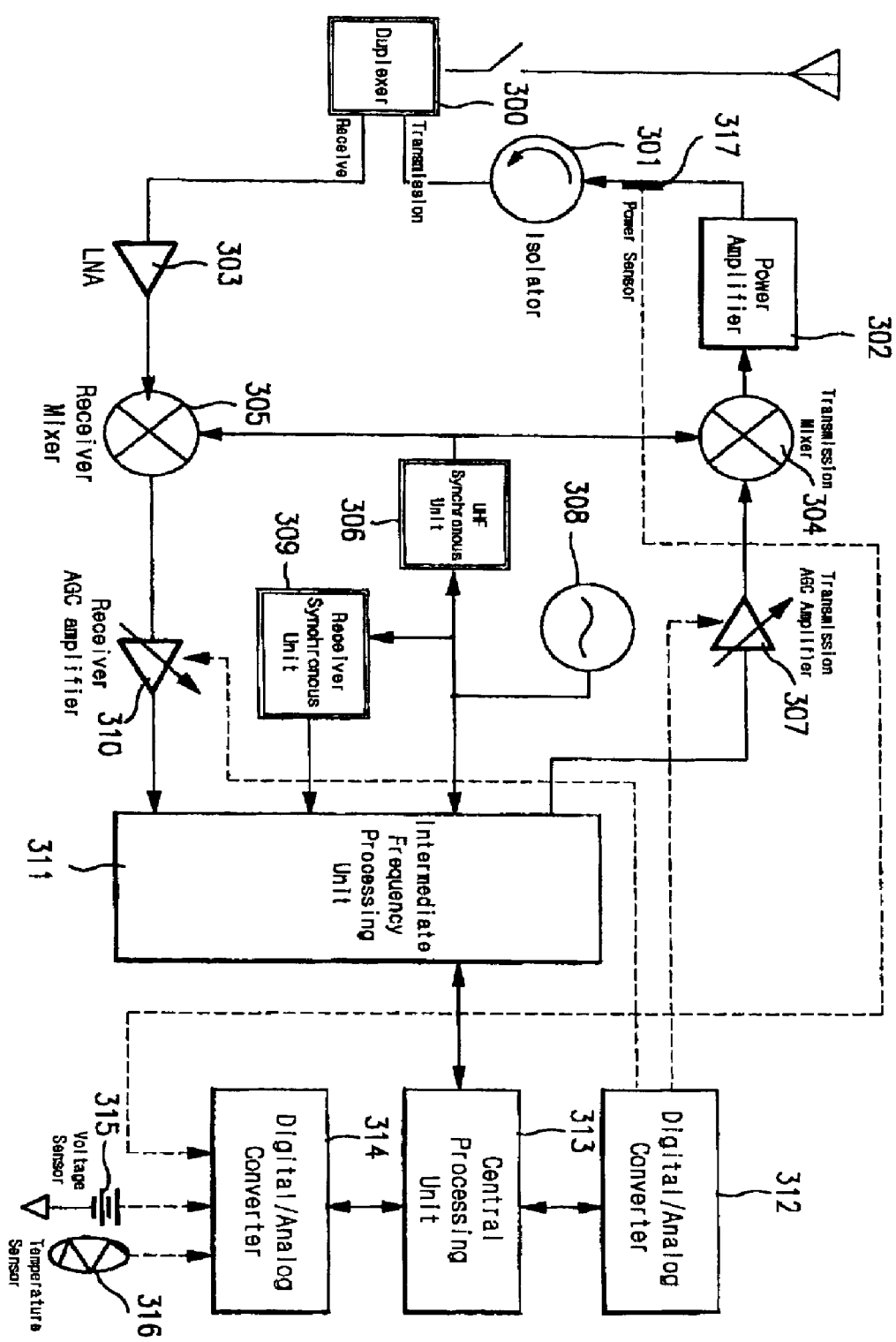
FIG. 5 is a block diagram for showing the structure of a mobile terminal according to the invention.

FIG. 5 is a block diagram for showing the structure of a mobile terminal according to the invention.

Referring to FIG. 5, the mobile terminal of the invention has a duplexer 300 for separating a received frequency signal only, an LNA (Low Noise Amplifier) 303 for amplifying a received radio frequency signal, a receiver mixer 305 for converting down the amplified radio frequency signal to first intermediate frequency signal, a received gain amplifier 310 for amplifying the first intermediate frequency signal from the receiver mixer 305, an intermediate frequency treatment unit 311 which converts down again the first intermediate frequency from the received gain amplifier 310 to output second intermediate frequency signal or converts up a signal from a vocoder (not shown) to an intermediate signal for transmission, a transmission gain amplifier 307 for amplifying the intermediate frequency signal which is outputted from the vocoder and then converted via the intermediate frequency treatment unit 311, a transmission mixer 304 for converting up the intermediate frequency signal from the transmission gain amplifier 307, a power amplifier 302 for amplifying the radio frequency signal from the transmission mixer 304, an isolator 301 for isolating a transmission signal from signals to transmit to an antenna, a frequency oscillator 308 for generating a local oscillated frequency for transmission/receiving a UHF synchronous unit 306, a receiver synchronous unit 309, a central processing unit 313 for controlling each device, a digital/analog converter 312 for providing information which controls the transmission and received gain amplifiers 307 and 310 according to the operated condition of the terminal a digital/analog converter 314 connected to a power sensor 317 for detecting power of the transmission signal, a power sensor 315 for sensing a battery capacity, and a temperature sensor 316 for sensing the temperature of the terminal.

The operations of the mobile terminal constructed as above will be described separately on transmission and receiving.

First, in receiving, the radio frequency signal inputted through the antenna is separated with only the received frequency signal by the duplexer 300. The received signal is amplified by the LNA 303 and then amplified to the first intermediate frequency signal by the receiver mixer 305. The first intermediate frequency signal from the receiver mixer 305 is amplified by the received gain amplifier 310 and then inputted into the intermediate frequency treatment unit 311, and the intermediate frequency treatment unit 311 converts down the inputted first intermediate frequency signal to generate and transmit the second intermediate frequency signal to the vocoder according to the control of the central processing unit 313.

Meanwhile, in the transmission, the intermediate frequency signal from the second frequency treatment unit 311 is amplified in power by the transmission gain amplifier 307. The intermediate frequency signal from the transmission gain amplifier 307 is converted up to the radio frequency in the transmission mixer 304, and this radio frequency signal is amplified in power by the power amplifier 302 and then transmitted to the antenna via the isolator 301

In this transmission/receiving operations, the information provided by the digital/analog converter 312 adjusts the gains of the transmission gain amplifier 307 and received gain amplifier 310 according to the operated condition of the terminal.

To maintain the optimum performance of the foregoing mobile terminal, various kinds of sensors, namely, a power sensor 317, a voltage sensor 315 and a temperature sensor 316 are installed.

Here, the temperature sensor 316 measures the internal temperature of the terminal to compensate elements sensitive to temperature influence For example, the temperature sensor 316 compensates output power according to the temperature of electric devices or assist to maintain the optimum receiving condition.

The voltage sensor 315 senses and displays the currently residing amount of the battery to inform the user of the condition of the battery or automatically powers off with an alarm sound when the amount is insufficient.

Also, the power sensor 317 measures and adjusts the power outputted during conversation according to the previously set output.

Furthermore, the digital/analog converter 314 controlled by the central processing unit 313 is provided to adjust the power of the input and output signals and set a desired output intensity.

If the information sensed by these sensors are called objective information about the operative performance of the terminal, other analogous information about the operative performance of the terminal can be extracted from this objective information.

The objective information includes a present temperature and voltage of the terminal, received intensity variation according to the gain control of the received signal, and output intensity variation according to the gain control of the originating signal. From the objective information, frame error rate of the received signal, hand off state, carrier energy (Ec), carrier interference (Ic), change of radio channels according to hashing change and inspection of base station cell plan condition therefrom, location of the terminal according to PN environment information, error logging files, and data logging files can be extracted as the analogous information.

The mobile terminal of the invention transmits the objective and analogous information to the A/S center, and the A/S center analyzes the objective and analogous information transmitted from the mobile terminal to obtain information about the malfunctioning if any or performance of the terminal.

Also, the A/S center transmits the control information to the mobile terminal according to a result of the analysis and optimizes the operated condition of the mobile terminal.

Figure 6:
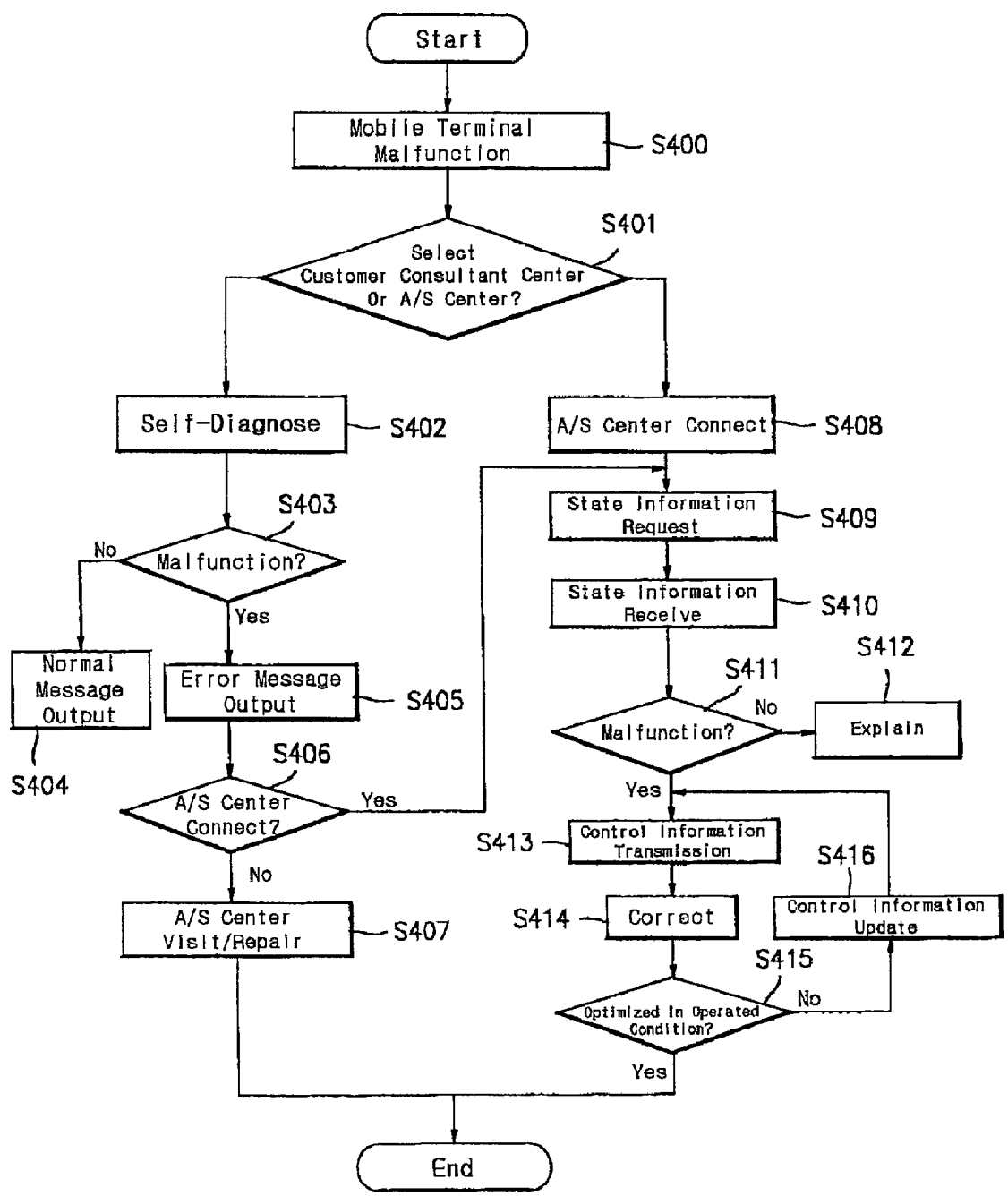
FIG. 6 is a flow chart for showing a method for after service of a mobile terminal according to the invention.

FIG. 6 is a flow chart for showing a method for after service of a mobile terminal according to the invention.

Referring to FIG. 6, if it is judged that the mobile terminal has a problem in the conversation performance in S400, a user determines whether to perform a self-diagnosing function provided by the mobile terminal or inquire an A/S center in S401.

Here, if the user executes the self-diagnosing function in S402, the mobile terminal uses installed self-diagnosing programs to inspect itself if it is malfunctioning in S403, and outputs a message informing the malfunction on a liquid crystal display panel in the case of malfunctioning in S405. Alternatively, in S404, the mobile terminal outputs a message informing that there is no problem on the liquid crystal display panel.

In S406, if the mobile terminal is in a conversable condition, the user calls to the A/S center and sets a call with the A/S center. However, if the mobile terminal is not conversable, the user visits the A/S center to request a repair of the terminal S407.

If the call is set between the mobile terminal and A/S center according to the step of S406, the mobile terminal transmits state information reporting the operated condition thereof to the A/S center, and the A/S center receives the state information transmitted from the mobile terminal in S410. Here, the state information is the foregoing objective and analogous information, and transmitted by using the SMS or data communication service.

Then in S411, the A/S center analyzes the received state information to judge if the corresponding mobile terminal is malfunctioning.

If the mobile terminal is malfunctioning as a result of the judgment, the A/S center transmits control information to correct the state of the mobile terminal and optimize the conversation performance in S413. Here, the A/S center transmits the control information by using the SMS or data communication service.

In S414, the mobile terminal corrects the operated condition thereof by the installed programs according to the control information provided by the A/S center and informs information of the result to the A/S center. Then, the A/S center reanalyzes the informed result information to judge if the mobile terminal is normally functioning or the performance is optimized in S415. Here, if the performance of the mobile terminal is not optimized, the control information is updated in S416, and the updated control information is transmitted to the mobile terminal again. The A/S center repeatedly transmits the control information until the conversation performance of the mobile terminal is optimized as above.

However, if the mobile terminal is normally functioning according to the judgment result of the step of S411, the A/S center transmits an explanation showing that there is no problem in S412.

Meanwhile, when the user wants to directly inquire the A/S center without executing the self-diagnosing function in the step of S401, the user pushes telephone number of the A/S center to set the call with the A/S center in S408.

Also, when the call is set between the mobile terminal and A/S center, the A/S center transmits a remote control message to the mobile terminal for requesting the state information in S409, and the mobile terminal transmits the state information showing the operated condition thereof to the A/S center according to the remote control message in S410.

Then, the A/S center receives the state information transmitted from the mobile terminal, and analyzes the received state information to judge if the mobile terminal is malfunctioning in S411.

Then, if the mobile terminal is malfunctioning as a result of the judgment, the A/S center transmits control information to correct the state of the mobile terminal and optimize the conversation performance in S413. Here, the A/S center transmits the control information by using the SMS or data communication service.

The control information includes a value required for the normal operation and obtained by comparing the reference value set by the A/S center with the present state of the mobile terminal that is the value of the malfunctioning.

Then, the mobile terminal runs the installed programs according to the control information provided by the A/S center to correct the operated condition and reports result information to the A/S center in S414. Then in S415, the A/S center reanalyzes the informed result information to judge if the mobile terminal is normally functioning or the performance is optimized. Here, if the performance of the mobile terminal is not optimized, the control information is updated in S416, and the updated control information is transmitted to the mobile terminal again.

Meanwhile, if the mobile terminal is normally functioning according to the judgment result of the step of S411, the A/S center transmits an explanation showing that there is no problem in S412.

As described hereinbefore according to the invention, the mobile terminal transmits the information according to the malfunction to the A/S center, and upon receiving the information, the A/S center analyzes the received information and transmits the control information to the mobile terminal to help the user of the mobile terminal directly control the malfunction of the mobile terminal in such a manner causing the mobile terminal to correct the malfunction thereof according to the control information, so that the user can optimize the state of the mobile terminal without visiting the A/S center in each malfunctioning of the terminal.

While the invention has been described in reference to the preferred embodiments and the appended drawings, it is apparent that the invention can adopt various modifications, changes and equivalents thereof. Also, it is apparent that the invention can be equally applied with relevant modifications. Therefore, the foregoing description does not restrict the scope of the invention, which is defined by the accompanying claims of the invention.

What is claimed is:

1. A method for after service of a mobile terminal comprising:
   executing a self-diagnosing function in the mobile terminal;
   outputting a message informing malfunction to a display panel of the mobile terminal;
   querying an on-board device of the mobile terminal to obtain state information;
   transmitting state information to an after service center via communication means;
   receiving instructions from the after service center for improving the operation of the mobile terminal; and
   executing said instructions received from the after service center.

2. The method for after service of a mobile terminal according to claim 1, further comprising: outputting an error message by the mobile terminal when the on-board device indicates an error.

3. The method for after service of a mobile terminal according to claim 1, wherein the communication means is a short messaging service.

4. The method for after service of a mobile terminal according to claim 1, wherein the communication means is a data communication service.

5. The method for after service of a mobile terminal according to claim 1, wherein the communication means includes a base station serving the mobile terminal, and in communication with the after service center.

6. The method for after service of a mobile terminal according to claim 1, wherein the state information of the mobile terminal includes objective information.

7. The method for after service of a mobile terminal according to claim 6, wherein the objective information includes at least one of temperature, voltage, received signal intensity, or transmitted signal intensity.

8. The method for after service of a mobile terminal according to claim 6, wherein the state information of the mobile terminal includes analytical information derived from the objective information.

9. The method for after service of a mobile terminal according to claim 8, wherein the analytical information includes at least one of frame error rate, hand off state, carrier interference, carrier energy, change of radio channels, location of mobile terminal, error logging files or data logging files.

10. The method for after service of a mobile terminal according to claim 1, further comprising:
    querying an on-board device of the mobile terminal to obtain new state information after executing said instructions; and
    transmitting new state information to the after service center.

11. The method for after service of a mobile terminal according to claim 10, further comprising:
    analyzing the new state information at the after service center;
    transmitting a new set of instructions to the mobile terminal; and
    executing the new instructions from the after service center.

12. The method for after service of a mobile terminal according to claim 1, further comprising repeating said querying, transmitting, receiving and executing said instructions, until a pre-determined level of performance of the mobile terminal is achieved.

13. The method of claim 1, wherein the on-board device includes at least one of a power sensor, a temperature sensor or a voltage sensor.

14. An apparatus for providing for service of a mobile terminal, comprising:
    a mobile terminal;
    an after service center; and
    a network for establishing communication between the mobile terminal and the after service center, wherein the mobile terminal is operable to perform a self-diagnosing function and output a message informing malfunction or proper operation to a display panel of the mobile terminal, and whereby information is transferred to adjust the performance parameters of the mobile terminal.

15. The apparatus of claim 14, wherein the network includes a base station connected to the after service center using the Public Switched Telephone Network.

16. The apparatus of claim 14, wherein the network includes a base station in radio communication with the after service center via a cellular radio network.

17. The apparatus of claim 14, wherein the base station is in radio communication with the after service center via a data communication network.

18. A subscriber unit for a communication network, comprising:
   a power sensor to measure the transmitted signal intensity;
   a voltage sensor to measure available battery voltage;
   a temperature sensor to measure the temperature of the subscriber unit;
   a transmitter to transmit information indicative of the measured temperature of the subscriber unit to an after service center; and
   a processor to adjust performance of the subscriber unit based on instructions received in response to an analysis performed by the after service center in response to at least one of transmission of the measured temperature, the transmitted signal intensity or the available battery voltage of the subscriber unit being sent in case of a malfunction detected by a self-diagnosis of the subscriber unit.

19. The subscriber unit of claim 18, wherein the temperature sensor measures an internal temperature of the subscriber unit and the subscriber unit adjusts output power according to the measured internal temperature.

20. The subscriber unit of claim 18, wherein the voltage sensor senses a current battery level.

21. The subscriber unit of claim 20, wherein the subscriber unit automatically powers off with an alarm sound when the sensed battery level is insufficient.

22. The subscriber unit of claim 18, wherein the power sensor measures and adjusts power outputted during conversation according to a previously set power output.

23. The method of claim 1, further comprising:
   requesting state information from the after service center for indicating the operated condition to the mobile terminal.

24. The method of claim 1, wherein said display panel is a liquid crystal display panel of said mobile terminal.

25. The apparatus of claim 14, wherein said display panel is a liquid crystal display panel of said mobile terminal.

26. The apparatus of claim 14, wherein said mobile terminal performs the self-diagnosing prior to transferring information through said network for establishing communication.

27. The apparatus of claim 14, wherein said after service center queries an on-board device of the mobile terminal to obtain state information.

28. The apparatus of claim 14, wherein said mobile terminal transmits state information to said after service center via communication means, said mobile terminal receives instruction from said after service center for improving the operation of the mobile terminal, and said mobile terminal executes said instructions received from said after service center.

* * * * *